(12) United States Patent
Ryu et al.

(10) Patent No.: US 10,360,594 B2
(45) Date of Patent: Jul. 23, 2019

(54) SERVER OFFERING SERVICE TARGETING USER AND SERVICE OFFERING METHOD THEREOF

(71) Applicant: SAMSUNG ELECTRONICS CO., LTD., Suwon-si, Gyeonggi-do (KR)

(72) Inventors: Je-hyok Ryu, Suwon-si (KR); Shin-il Kang, Suwon-si (KR); Hee-jun Song, Suwon-si (KR); Seung-yeol Yoo, Suwon-si (KR); Won-chang Jang, Seoul (KR); Gyu-tae Park, Seoul (KR); Hyun-sik Shim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 645 days.

(21) Appl. No.: 14/163,419

(22) Filed: Jan. 24, 2014

(65) Prior Publication Data
US 2014/0222572 A1 Aug. 7, 2014

(30) Foreign Application Priority Data

Feb. 1, 2013 (KR) .......................... 10-2013-0011784

(51) Int. Cl.
*G06Q 30/00* (2012.01)
*G06Q 30/02* (2012.01)

(52) U.S. Cl.
CPC .................. *G06Q 30/0261* (2013.01)

(58) Field of Classification Search
CPC ...................................................... G06Q 30/02
See application file for complete search history.

(56) References Cited

U.S. PATENT DOCUMENTS

| 6,970,929 B2* | 11/2005 | Bae .................. G06F 17/30861 |
| | | 707/999.001 |
| 7,107,046 B1* | 9/2006 | Mainard .................. G01S 5/02 |
| | | 455/414.2 |
| 7,668,832 B2 | 2/2010 | Yeh et al. |
| 2008/0057919 A1* | 3/2008 | Choi-Grogan ........ H04W 68/02 |
| | | 455/414.1 |
| 2008/0097966 A1 | 4/2008 | Choi et al. |

(Continued)

FOREIGN PATENT DOCUMENTS

WO WO 2010/085791 7/2010

OTHER PUBLICATIONS

International Search Report dated May 23, 2014 in corresponding International Application No. PCT/KR2014/000870.

(Continued)

*Primary Examiner* — Eric R Netzloff
*Assistant Examiner* — Christopher Stroud
(74) *Attorney, Agent, or Firm* — Staas & Halsey LLP

(57) ABSTRACT

A server for offering a service targeting a user and a service offering method thereof, the method including: collecting data from a plurality of user devices; determining a unit zone partitioned from a service zone based on geographic information; adjusting the unit zone based on the amount of data collectable according to the determined unit zones; performing modeling to parse the data collected according to the adjusted unit zones; and offering a service targeting a user of the unit zone, based on results from the modeling.

30 Claims, 10 Drawing Sheets

(56) References Cited

U.S. PATENT DOCUMENTS

| | | | |
|---|---|---|---|
| 2009/0054043 A1* | 2/2009 | Hamilton | G01S 5/0284 |
| | | | 455/414.2 |
| 2009/0075651 A1* | 3/2009 | MacNaughtan | G01S 5/0252 |
| | | | 455/434 |
| 2009/0138445 A1 | 5/2009 | White et al. | |
| 2010/0010958 A1* | 1/2010 | Perrow | G06F 17/30241 |
| | | | 707/E17.107 |
| 2010/0017289 A1* | 1/2010 | Sah | G06Q 30/02 |
| | | | 705/14.49 |
| 2010/0036807 A1* | 2/2010 | Lieske, Jr. | G06F 17/30241 |
| | | | 707/737 |
| 2010/0110905 A1* | 5/2010 | An | H04L 1/0002 |
| | | | 370/252 |
| 2010/0280985 A1* | 11/2010 | Duchon | G06N 7/005 |
| | | | 706/52 |
| 2011/0294517 A1* | 12/2011 | Hahm | G01C 17/28 |
| | | | 455/456.1 |

OTHER PUBLICATIONS

Korean Office Action dated May 21, 2019 in Korean Patent Application No. 10-2013-0011784.

* cited by examiner

SERVER OFFERING SERVICE TARGETING USER AND SERVICE OFFERING METHOD THEREOF

CROSS-REFERENCE TO RELATED APPLICATIONS

This application claims priority from Korean Patent Application No. 10-2013-0011784, filed on Feb. 1, 2013 in the Korean Intellectual Property Office, the disclosure of which is incorporated herein by reference.

BACKGROUND

1. Field

Apparatuses and methods consistent with the exemplary embodiments relate to a server for offering a service targeting a user and a service offering method thereof, and more particularly to a server for offering a service targeting a user and a service offering method thereof, in which the service is provided to a user device, based on a unit zone using geographic information.

2. Description of the Related Art

With the release of various digital devices such as a Smart television (TV), a tablet personal computer (PC), a mobile phone, etc., a demand for an interactive service using these devices has been gradually on the rise.

The interactive service may for example include an advertisement for targeting a certain user; a search keyword; direction information during driving or walking; price information about goods (or price comparison information); information about a nearby restaurant, shop or tourist spot; show time of a film; contact information for businesses; traffic information; etc. These examples may increase as time goes on and as the devices are diversified.

The interactive service may be provided based on location information of a moving or stationary user. However, a user's location information includes so many variables that there is a need to dynamically control a service offering unit. For instance, if the same service offering unit is equally applied to a location having a large floating population and a location having a small floating population for the simple reason that the locations have the same area, a service may be abnormally offered because load suddenly increases in the service offering unit corresponding to the location having the large floating population. Also, in the case of highly dense residential and office zones, a demand for a service may be varied depending on time slots, and therefore there is a need of reflecting it properly.

SUMMARY

According to an aspect of an exemplary embodiment, a method of offering a service targeting a user, performed in a server that manages data, is provided which includes: collecting data from a plurality of user devices; determining a unit zone partitioned from a service zone based on geographic information; adjusting the unit zone based on the amount of data collectable according to the determined unit zones; performing modeling to parse the data collected according to the adjusted unit zones; and offering a service targeting a user of the unit zone, based on results from the modeling.

The determining the unit zone may include excluding unit zones corresponding to Polar Regions and the ocean from the service zone.

The adjusting the unit zone may include setting up a first minimum number of keywords with regard to data collected according to the unit zones, and excluding a unit zone, where the collected data is equal to or more than the first minimum number of keywords, from the service zone.

The adjusting the unit zone may include making two or more unit zones cluster together or partitioning one unit zone into two or more.

The adjusting the unit zone may include setting up a second minimum number of keywords with regard to data collected according to the unit zones, and making a unit zone, where the collected data is less than the second minimum number of keywords, and its neighboring unit zone cluster together.

The adjusting the unit zone may include setting up a maximum number of keywords with regard to data collected according to the unit zones, and partitioning a unit zone, where the collected data is equal to or more than the maximum number of keywords, into two or more.

The adjusting the unit zone may be performed on a preset cycle or in response to a request of a manager.

The determining the unit zone may include using coordinate information according to physical distances or identification information of a location managing unit of a mobile communication network.

The unit zone may have a grouped hierarchical structure which includes a plurality of first unit zones and a plurality of second unit zones that belong to each first unit zone.

The performing the modeling may include determining a representative topic based on a probability value according to topics of data collected according to the unit zones; and extracting a high-rank keyword list with respect to the representative topic.

The collecting the data may include receiving location information and log information about the user device.

The method may further include determining the location information based on information about moving speed of the user device.

The collecting the data may include periodically receiving and accumulatively storing data and sequentially deleting data of which a preset period of time is expired.

The collected data may include at least one of a search keyword, time information, location information, a time stamp, identification information, a usage history, and a user input command.

The service to be offered may include at least one of an advertisement targeting a user in the unit zone, a search keyword, direction information during driving or walking; price information about goods, information about a nearby restaurant, shop and tourist spot, show time of a film, contact information for business, and traffic information.

According to an aspect of another exemplary embodiment, a server of offering a service targeting a user to a plurality of user devices is provided, the server including: a communicator which collects data from the plurality of user devices; a storage which stores the collected data; and a controller which determines a unit zone partitioned from a service zone based on geographic information, adjusts the unit zone based on the amount of data collectable according to the determined unit zones, performs modeling to parse the data collected according to the adjusted unit zones, and offers a service targeting a user of the unit zone, based on results from the modeling.

The controller may exclude unit zones corresponding to Polar Regions and the ocean from the service zone.

The controller may set up a first minimum number of keywords with regard to data collected according to the unit zones, and exclude a unit zone, where the collected data is equal to or more than the first minimum number of keywords, from the service zone.

The controller may make two or more unit zones cluster together or partition one unit zone into two or more.

The controller may set up a second minimum number of keywords with regard to data collected according to the unit zones, and make a unit zone, where the collected data is less than the second minimum number of keywords, and its neighboring unit zone cluster together.

The controller may set up a maximum number of keywords with regard to data collected according to the unit zones, and partition a unit zone, where the collected data is equal to or more than the maximum number of keywords, into two or more.

The unit zone may be adjusted on a preset cycle or in response to a request of a manager.

The unit zone may be determined using coordinate information according to physical distances or identification information of a location managing unit of a mobile communication network.

The unit zone may have a grouped hierarchical structure which includes a plurality of first unit zones and a plurality of second unit zones that belong to each first unit zone.

The controller may perform the modeling by determining a representative topic based on a probability value according to topics of data collected according to the unit zones; and extracting a high-rank keyword list with respect to the representative topic.

The communicator may receive location information and log information about the plurality of user devices.

The controller may further receive information about moving speed of the user device, and determine the location information based on the information about moving speed of the user device.

The controller may control the communicator to periodically receive data from the plurality of user devices, accumulatively store the received data in the storage, and sequentially delete data of which a preset period of time is expired.

The collected data may include at least one of a search keyword, time information, location information, a time stamp, identification information, a usage history, and a user input command.

The service to be offered may include at least one of an advertisement targeting a user in the unit zone, a search keyword, direction information during driving or walking; price information about goods, information about a nearby restaurant, shop and tourist spot, show time of a film, contact information for business, and traffic information.

Additional aspects and/or advantages will be set forth in part in the description which follows and, in part, will be apparent from the description, or may be learned by practice of the invention.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
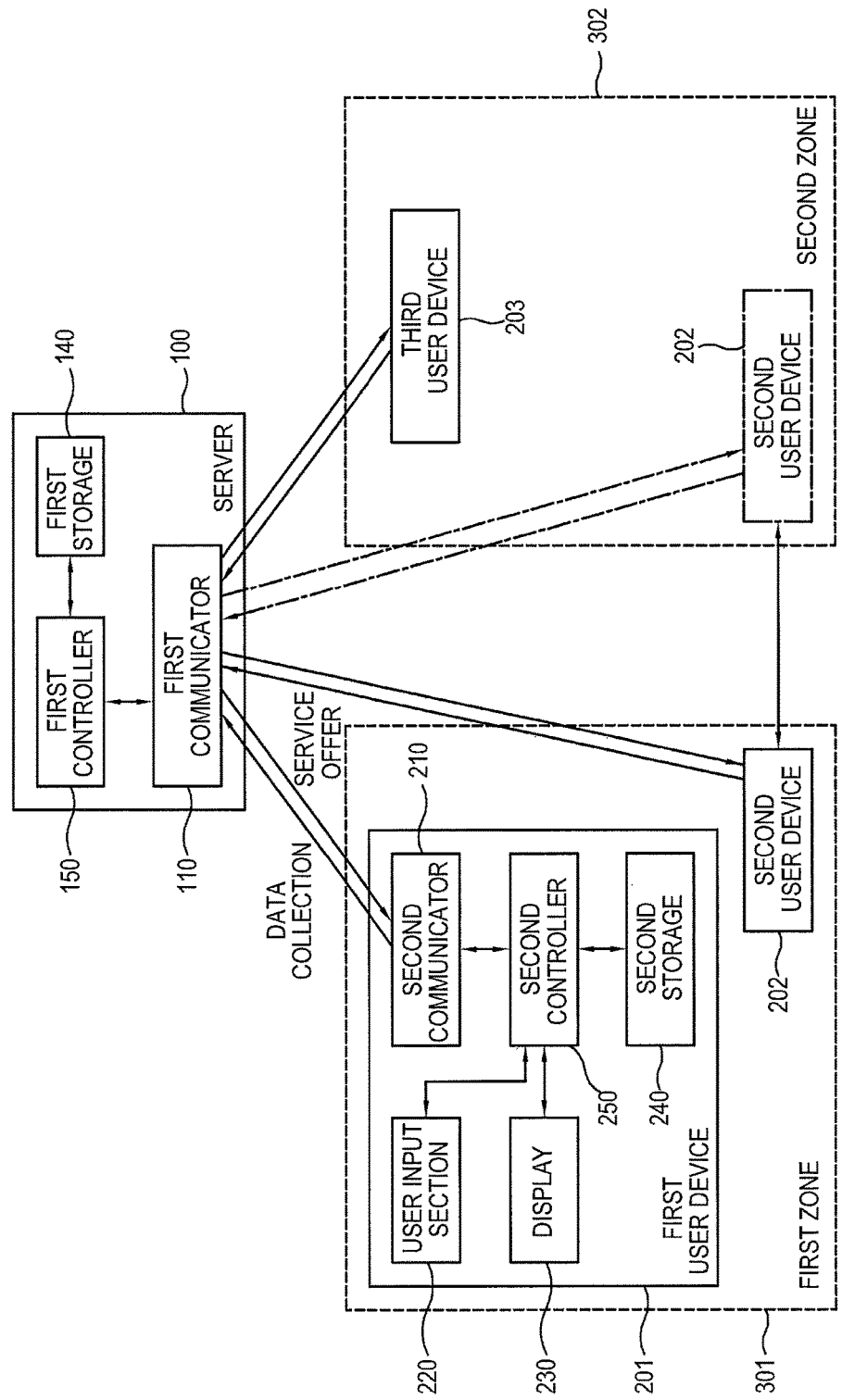
FIG. 1 is a block diagram showing a system for offering a service targeting a user according to an exemplary embodiment.

Below, exemplary embodiments will be described in detail with reference to accompanying drawings, wherein like reference numerals refer to the like elements throughout.

FIG. 1 is a block diagram showing a system for offering a service targeting a user according to an exemplary embodiment.

As shown in FIG. 1, a user-target service offering system according to an exemplary embodiment includes a server 100 for offering the service and a plurality of user devices 201, 202 and 203.

The server 100 receives and stores data from the plurality of user devices 201, 202 and 203, and offers a target service (hereinafter, referred to as a 'service') based on the stored data to the plurality of user devices 201, 202 and 203. The plurality of user devices 201, 202 and 203 are client devices of receiving the service from the server 100.

The target service is an interactive service optimized/personalized for users of the user devices 201, 202 and 203, which includes an advertisement for targeting a certain user; a search keyword; direction information during driving or walking; price information about goods (or price comparison information); information about a nearby restaurant, shop and tourist spot; show time of a film; contact information for business; traffic information; etc. The target service is offered targeting a user of each user device, based on the data received from the plurality of user devices 201, 202 and 203.

The user devices 201, 202 and 203 transmit various data to the server 100 and receive the service from the server 100. The user devices 201, 202 and 203 may be a stationary or mobile device.

In this exemplary embodiment, the user devices 201, 202 and 203 are located in unit zones. Specifically, as shown in FIG. 1, first and second user devices 201 and 202 are located in a first zone 301, and a third user device 203 is located in a second zone 302. Here, the first and second zones 301 and 302 are unit zones, into which a service zone for providing a service according to an exemplary embodiment is partitioned based on geographic information, and which are also called geo-units. Embodiments for setting up the unit zone will be described in more detail with reference to FIGS. 3 to 7.

If the user devices 201, 202 and 203 are mobile devices, the unit zones may be varied depending on their movement. For example, referring to FIG. 1, the second user device 202 located in the first zone 301 may move from the first zone 301 to the second zone 302 as its owner moves. The server 100 communicates with the second user device 202 and thus senses that the second user device 202 is located in the second zone 302, thereby offering a service corresponding to the second zone 302.

In this exemplary embodiment, the user devices 201, 202 and 203 may include a TV (e.g., a Smart TV), a set-top box, a desktop computer, a laptop computer (e.g., a notebook computer), a tablet personal computer (PC), a mobile phone (e.g., a Smart phone), a navigation system for a vehicle, a portable media player (e.g., an MP3 player), and various stationary or mobile digital devices.

As shown in FIG. 1, the server 100 includes a first communicator 110 connecting for communication with the plurality of user devices 201, 202 and 203; a first storage 140 storing data/information without limitation; and a first controller 150 controlling general operations of the server 100.

Here, the first communicator 110 is connected to a network for communication, to which plurality of user devices 201, 202 and 203 are connected, in accordance with wired/wireless communication protocols.

The first storage 140 may include a flash memory, a hard disk drive, or nonvolatile storage medium, and may be provided inside or outside the server 100. If the first storage 140 is externally provided, the server 100 may connect to the first storage 140 through the first communicator 110. In this exemplary embodiment, the first storage 140 may store data collected from the plurality of user devices 201, 202 and 203 (for example, log data according to search); information about a plurality of unit zones partitioned with respect to the service zone; a list of high rank keywords for providing a target service according to the respective unit zones; etc.

The first controller 150 controls the first communicator 110 to receive data from the user devices 201, 202 and 203; partitions the service zone into a plurality of unit zone; and adjusts the partitioned unit zones to thereby store the received data in the first storage 140 according to the unit zones. The first controller 150 parses the stored data; extracts the high-rank keyword lists according to the unit zones; and controls the first communicator 110 to respectively offer services based on the extracted high-rank keyword list to the user devices 201, 202 and 203.

Each of user devices 201, 202 and 203 includes a second communicator 210 connected for communication with the server 100; the user input section 220 for receiving a user's command; a display 230 for displaying contents corresponding to a service; a second storage 240 for storing data/information without limitation; and a second controller 250 for controlling general operations of each of the user devices 201, 202 and 203.

The second communicator 210 is connected to a network for communication, to which the server 100 is connected, in accordance with wired/wireless communication protocols, thereby transmitting data (e.g., a log file) to the server 100 and receiving a service from the server 100.

The user input section 220 includes a keypad, a touch pad, a voice input unit, etc. for a user's control, and receives various commands such as a service request from a user.

The second controller 250 controls the second communicator 210 to transmit various log data generated in the user devices 201, 202 and 203 to the server 100. If a user inputs a predetermined service request, the second controller 250 detects it and controls the first communicator 210 to ask the server 100 for the corresponding service and receive data for the corresponding service. Contents of the received service may be offered to a user through the display 230.

Figure 2:
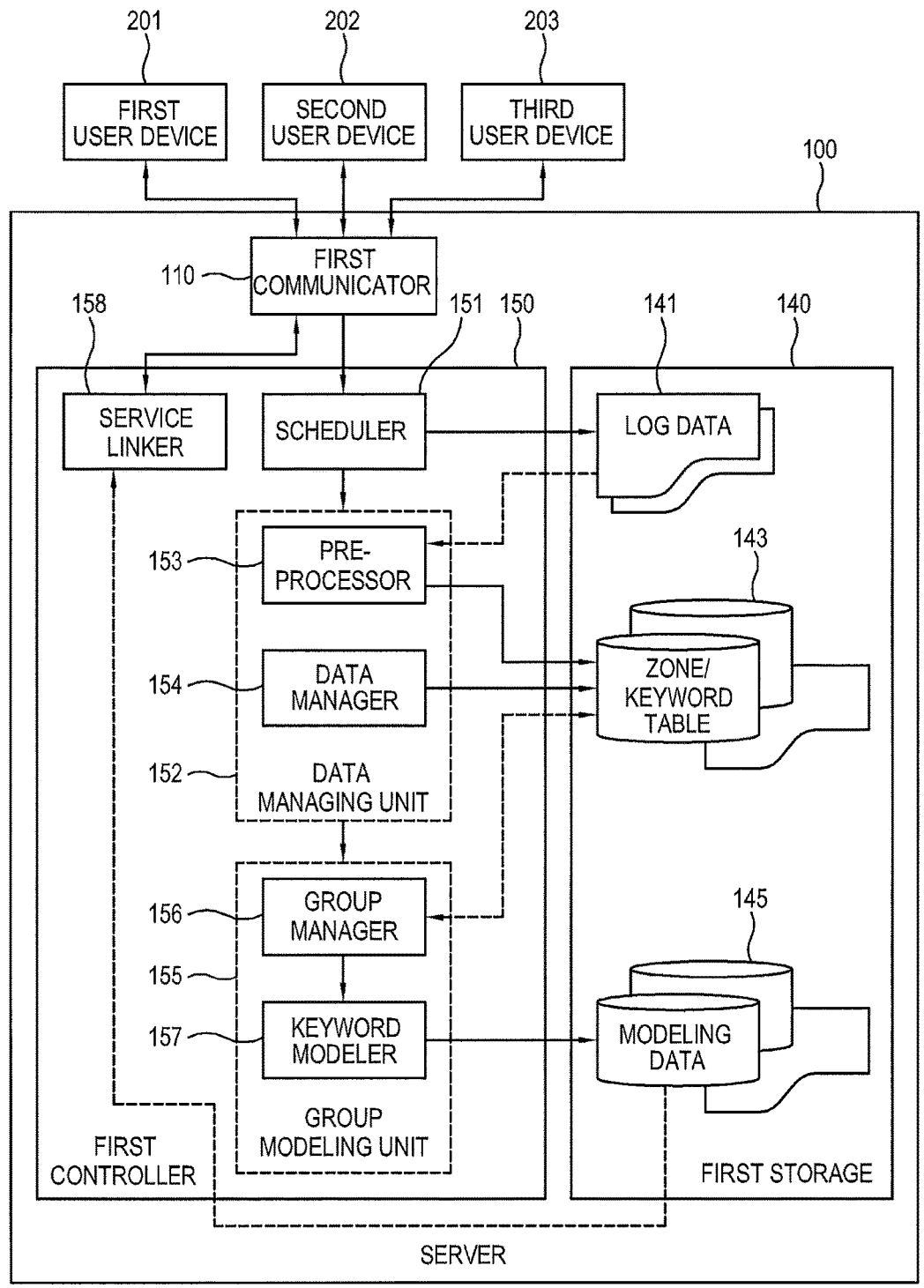
FIG. 2 is a block diagram showing a server of FIG. 1 in more detail.

FIG. 2 is a block diagram showing the server 100 of FIG. 1 in more detail.

As shown in FIG. 2, the first controller 150 of the server 100 includes a scheduler 151, a data managing unit (also, called a geo-user data manager) 152, a group modeling unit (also, called a geo-group behavior modeler) 155, and a service linker 158. The data managing unit 152 includes a pre-processor 153 and a data manager 154. The group modeling unit 155 includes a group manager 156 and a keyword modeler 157.

The first storage 140 may include a database (DB) that respectively constitutes log data 141, a zone/keyword table (i.e., a geo-unit/keyword table) 143, and modeling data 145. In this exemplary embodiment, every database in the data managing unit 152, the group modeling unit 155 and the first storage 140 will be called a geo-user interest recommender (GUIR). Further, the GUIR (or a GUIR system) serves to perform communication with the user devices 201, 202 and 203, collect and store data, parses (or operates) the stored data, and offer a service corresponding to an parsing result to the user devices 201, 202 and 203.

The first storage 140 and the first controller 150 include internal elements shown in FIG. 2, but not limited thereto. For example, the internal elements of the first controller 150 may operate as the first controller 150 executes a program or the like predetermined software, and the database of the first storage 140 may be provided outside the server 100. If the database is externally provided, the server 100 writes/reads/deletes the data through the first communicator 110.

The scheduler 151 collects data from the user devices 201, 202 and 203 in accordance with preset cycles. Here, the collected data includes logs where various execution histories generated in each of the user devices 201, 202 and 203 are written. The collected logs are stored as log data 141 in the first storage 140, and used in the following parsing.

The scheduler 151 may periodically access the log data 141, read/write the log files, and delete the previously stored log file. The collected log data include search keywords; time information; location information of the user devices 201, 202 and 203; time stamp; identification (ID) information of the user devices 201, 202 and 203; various application usage histories including applications; input commands input by a user for requesting a predetermined service; etc. For example, the location information may include information such as latitude/longitude of a global positioning system (GPS), cell ID, coordinates based on public IP address, etc. which can be used for determining a user's location.

The log data 141 to be input/output may be set up to be stored at a preset location of the first storage 140, or stored for a preset time limit. The scheduler 151 may set up the location, the time limit, etc. for storing the log data 141 in accordance with a user's input, a default, etc.

In this exemplary embodiment, the scheduler 151 receives and stores the log data 141 and invokes the data managing unit 152 of the GUIR.

The pre-processor 153 accesses the log data 141 collected by the scheduler 151 and reads the collected log data 141 when the GUIR is invoked by the scheduler 151 and operates. Specifically, the pre-processor 153 extracts needed data from the read log data 141, transforms the data to have a format required by the GUIR, and transmits and loads it to be stored in the zone/keyword table 143 (hereinafter, referred to as extract, transform and loading (ETL)) to thereby get the following unit zone and keyword data.

Here, the data stored in the zone/keyword table 143 may be determined in accordance with services available in the server 100. For example, location information, ID of a user device, a search keyword input by a user, a total number of input keywords, time stamp, country information of the corresponding user device, etc. may be stored in the zone/keyword table 143.

The data manager 154 partitions the service zone into the plurality of unit zones (i.e., geo units) based on the geographic information, and updates the data stored in the zone/keyword table 143 by the pre-processor 153 to be managed according to the unit zones. Here, the unit zone may be determined using coordinate information based on a physical distance or identification information of the location managing unit of the mobile communication network.

The zone/keyword table 143 includes a zone table (i.e., a geo-unit table) where the unit zone information (i.e., the location information) is stored, and a keyword table where the data extracted from the log data 141 of the user devices 201, 202 and 203 is managed and stored according to the unit zones. For example, a search keyword may be stored in the keyword table of the zone/keyword table 143, in connection with the information (i.e., the coordinate information) of the unit zone where the corresponding search is performed.

FIGS. 3 to 6 are views for explaining embodiments where the unit zone is determined based on the coordinate information according to the physical distances (hereinafter, referred to as "GEO-GRID embodiments").

The data manager 154 may partition the service zone (e.g., the whole world) into a plurality of zones according to the physical distances based on latitude/longitude. For example, referring to FIG. 3, the data manager 154 horizontally and vertically partitions the whole world into 12*6 first partitioned zones 31 as a service zone for a global service according to the physical distances based on latitude/longitude, and also partitions each first partitioned zone 31 into 9 second partitioned zones (hereinafter, referred to as grid cells (GC)) 32. Such partitioned service zones includes a total second partitioned zones (GC) 32 of 648, i.e., 12 (horizontal)*6(vertical)*9 GC=648 GC. Here, the second partitioned zone (GC) 32 corresponds to a physical zone at 10 degrees latitude*10 degrees longitude. Here, one degree latitude corresponds to a distance of about 110 km, and one degree longitude corresponds to a distance of about 94 km.

Figure 3:
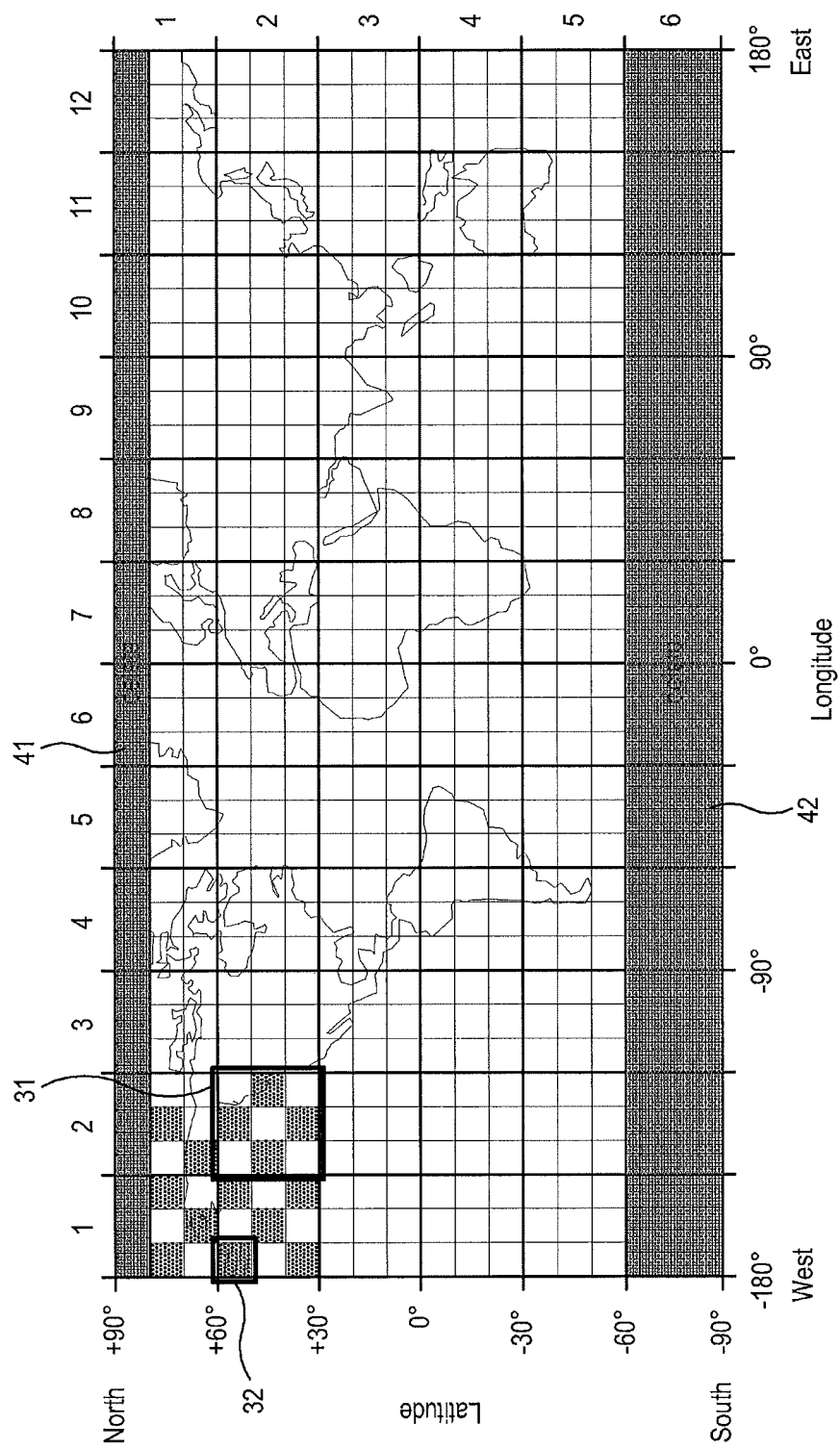
FIGS. 3 to 6 are views for explaining embodiments where a unit zone is determined based on coordinate information according to physical distances.

The data manager 154 may exclude a zone where there is few or no users (residents) from the service zone in order to decrease load of unnecessary parsing. For example, as shown in FIG. 3, Polar Regions at 80 to 90 and −90 to −60 degrees latitude are excluded from the service zone. Thus, it is possible to reduce the amount of data collected for the global service targeting the whole world, and enhance a processing efficiency.

Referring to FIG. 3, 144 GC corresponding to 12*3=44 GC at 80 to 90 degrees north latitude and 12*9=108 GC at −90 to −60 degrees south latitude are excluded from the service zone. Thus, 648 GC−108 GC=540 GC, i.e., a total second partitioned zones (GC) 32 of 540 is determined as the service zone.

Figure 4:
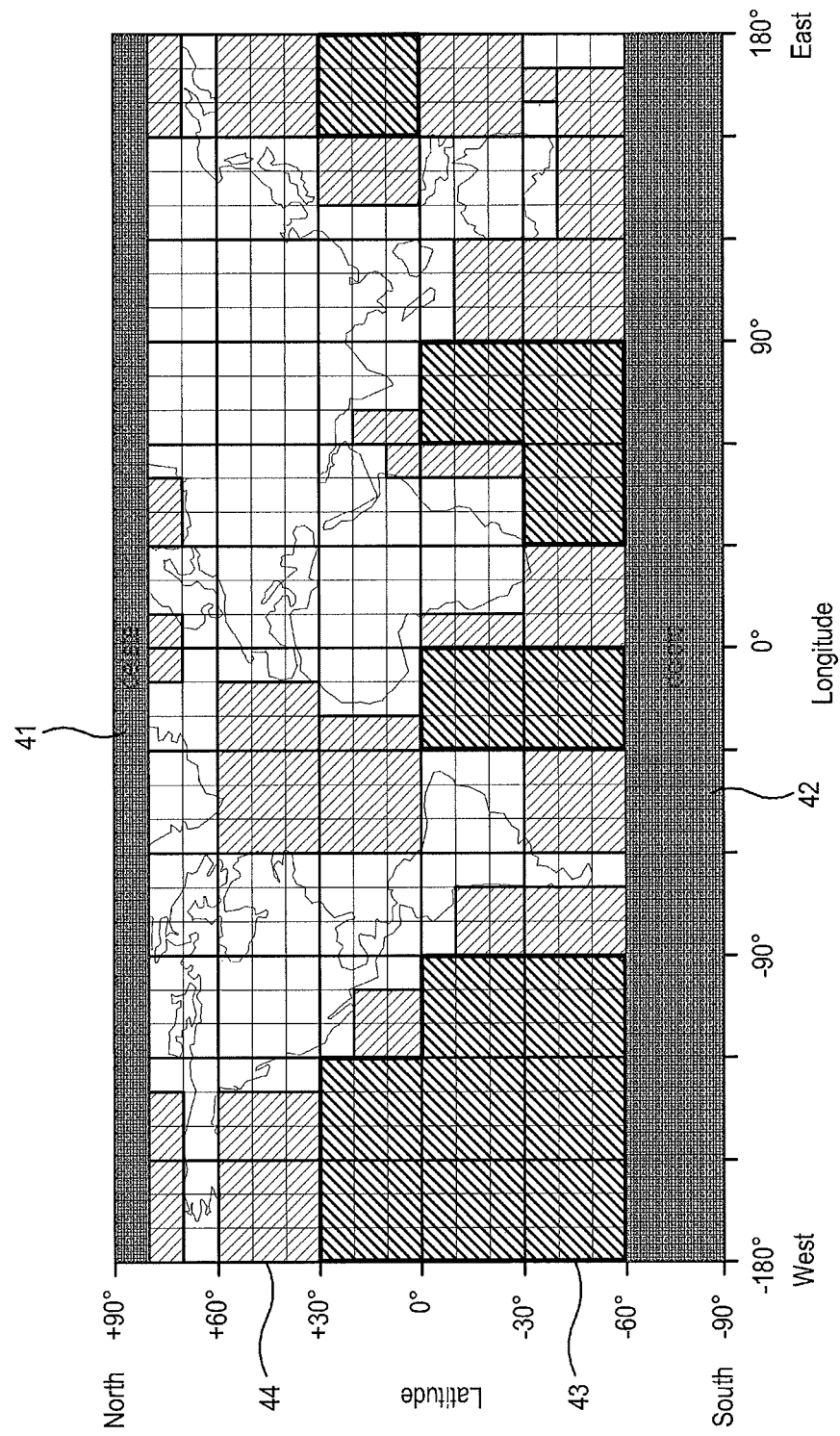

Further, the data manager 154 may exclude a zone corresponding to the ocean from the service zone as shown in FIG. 4. For example, the data manager 154 preferentially removes the zone 43 to be excluded, i.e., about 126 GC (14*9) corresponding to the ocean with respect to the first partitioned zone 31 of FIG. 3, and then removes the zone 44 to be excluded, i.e., about 144 GC corresponding to the ocean with respect to the second partitioned zone 32. In this case, the zones to be removed corresponding to the ocean are about 270 GC. Thus, 504 GC−270 GC=234 GC, i.e., a total second partitioned zone (GC) 32 of 234 is determined as the service zone.

Accordingly, more than one-third or half of the whole global zones are removed from the service zone, and it is therefore possible to reduce the load of the server 100 and improve efficiency of processes in parsing for the service and offering the service.

Referring to FIGS. 3 and 4, the data manager 154 partitions the second partitioned zones (GC) 32, which are remaining in the service zone by removing the zones 41, 42, 43 and 44 to be excluded, into a plurality of third partitioned zones 33 (hereinafter, referred to as world grids (WG)), and also partitions the third partitioned zone (WG) 33 into a plurality of fourth partitioned zones 34 (hereinafter, referred to as town grids (TG)).

Here, the WG 33 and the TG 34 are used as the unit zone (i.e., the geo-unit) where the server 100 collects data from the user devices 201, 202 and 203 and performs the modeling for offering the service. Thus, the unit zone in this embodiment is set up to have a hierarchical structure where a group includes the WG 33 and each group (i.e., the WG 33) includes a plurality of TGs 34.

Figure 5:
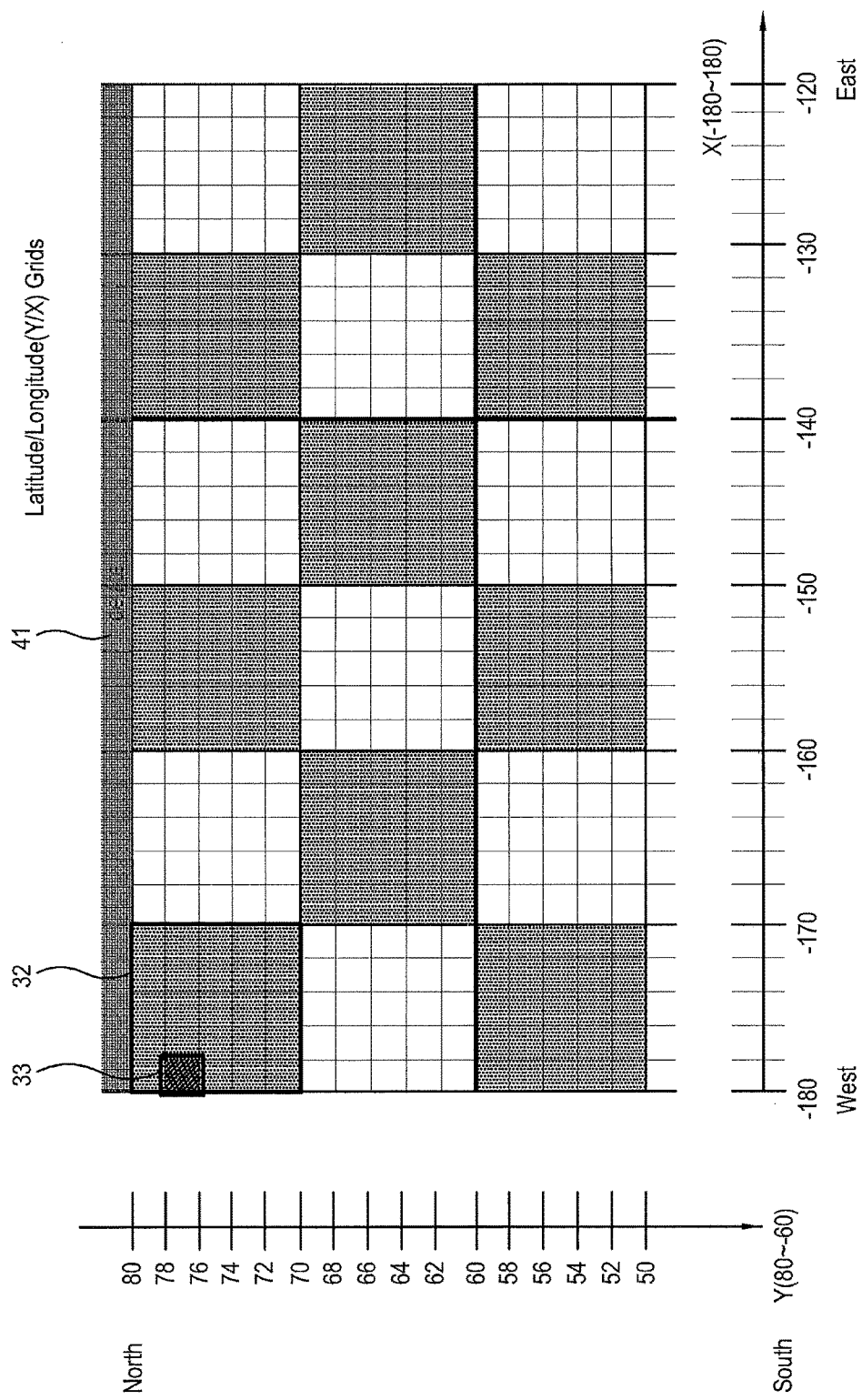

For example, one WG 33 is set up to have a size of about 2 degrees latitude/longitude (i.e., latitude≈220 km, and longitude≈118 km) referring to FIG. 5, and one TG 34 is set up to have a size of about 0.005 degrees latitude/longitude (i.e., latitude≈5.5 km, and longitude≈4.5 km). One TG 34 set up as above has an area of about 2.475 $km^2$, which corresponds to one Gu unit in Korea or a County unit or a small city unit in the United States of America.

Figure 6:
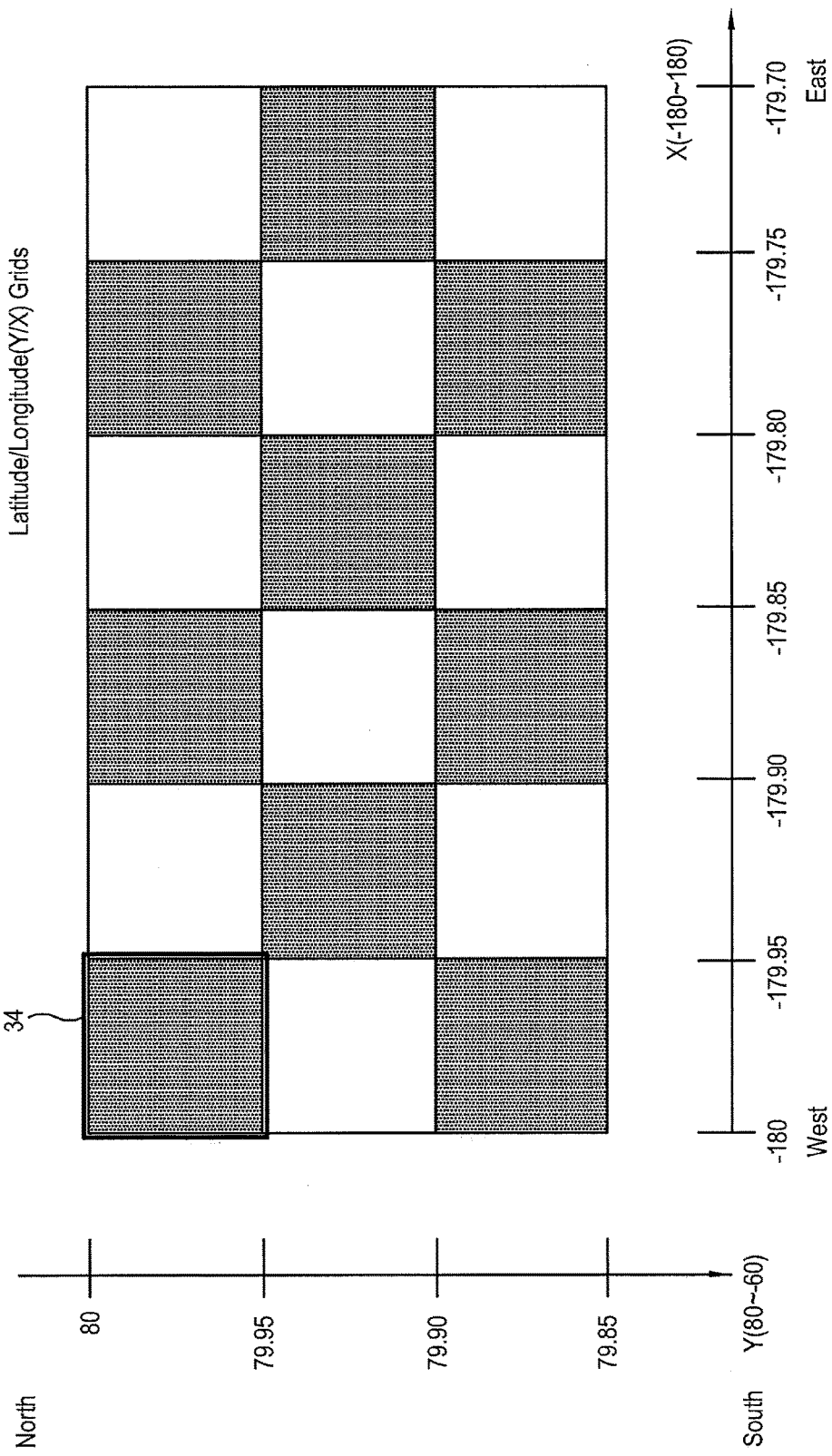

In the embodiments shown in FIGS. 5 and 6, the whole world is partitioned into about 16,200 WGs 33, and each WG 33 is partitioned into about 1600 TGs 34. Here, if the Polar Regions are excluded, the remaining service zones includes about 12,600 WGs (=504 GC*25 WG/GC). In addition, if the ocean regions are excluded, more than about one-third WGs are removed and thus about 5,850 WGs (=234 GC*25 WG/GC) constitute the service zone.

Meanwhile, an embodiment of using a location managing unit of the mobile communication network is also possible besides the GEO-GRID embodiment using the coordinate information according to the physical distances. Here, the location managing unit of the mobile communication network may be set up as a zone to be managed by a cell tower.

Figure 7:
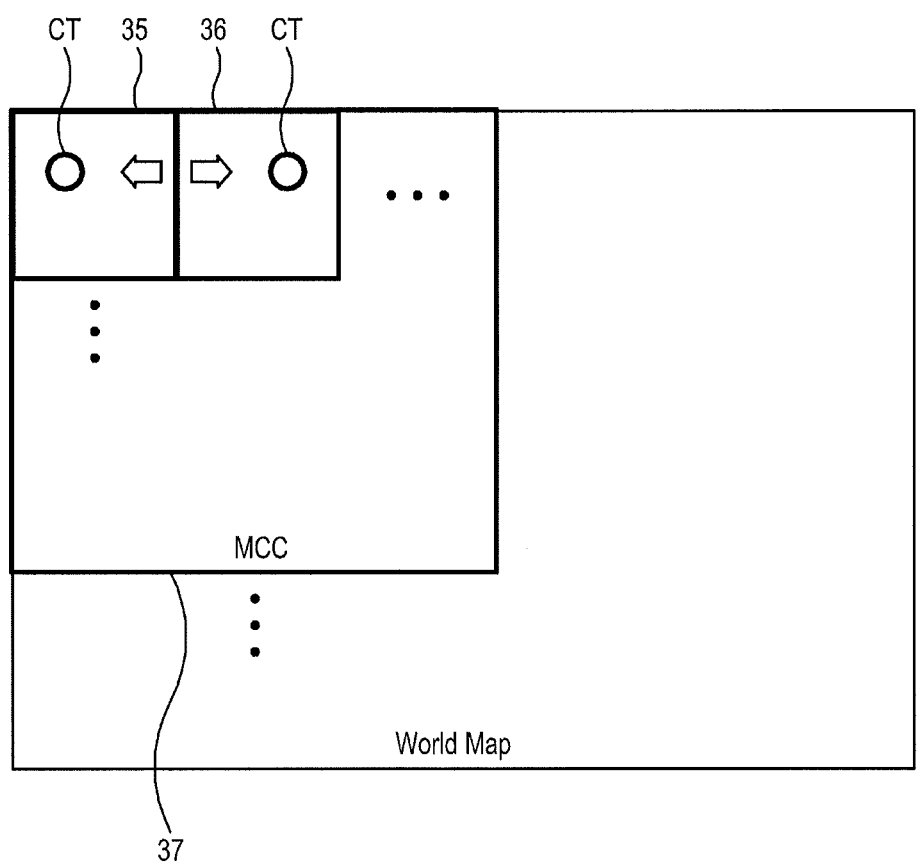
FIG. 7 is a view for explaining an embodiment where a unit zone is determined based on a location managing unit of a mobile communication network.

FIG. 7 is a view for explaining an embodiment where a unit zone is determined based on the location managing unit of the mobile communication network (hereinafter, referred to as a "GEO-CELL embodiment").

As shown in FIG. 7, the data manager 154 may determine a plurality of fifth partitioned zones 35, which are managed by a plurality of cell towers of a wireless mobile communication network, as unit zones (hereinafter, referred to as CT). Here, the data manager 154 may employ the location information mapped according to the cell towers and the identification information (i.e., cell ID) of the cell towers in order to determine the unit zones 35 and 36, and may additionally employ information of a country unit. Here, as shown in FIG. 7, the unit zones CT 35 and 36 of the GEO-CELL embodiment may correspond to the unit zone TG 34 of the GEO-GRID embodiment. In this case, the data manager 154 may generates the unit zone 37 to be managed by the country unit information MCC (hereinafter, referred to as an "MCC") as a unit zone grouped corresponding to the unit zone WG 33 of the GEO-GRID embodiment. As shown in FIG. 7, one MCC 37 includes a plurality of CTs 35 and 36, the unit zone is set up to have a hierarchical structure according to the groups.

In this exemplary embodiment, the WG, the MCC and the like grouped unit zone will be called the first unit zone, and the TG, the CT and the like segmented unit zone will be called the second unit zone.

In even the GEO-CELL embodiment shown in FIG. 7, the Polar Regions, the ocean regions and the like zones where there is few or no users may be excluded from the service zone. For example, the data manager 154 may exclude the zone where there is no cell tower from the service zone by ignoring it, or exclude the zone to be removed from the service zone, based on the coordinate information as shown in FIGS. 3 and 4.

As above, if the unit zone WG, TG, CT, MCC is determined through the coordinate information or the location managing unit of the mobile communication network, the data manager 154 stores the log data 141 collected from the user devices 201, 202 and 203, together with the location information of the unit zone, in the zone/keyword table 143 in connection with the corresponding unit zone WG, TG, CT, MCC. The log data stored in the zone/keyword table 143 is used in a service via the modeling process. In this exemplary embodiment, the unit zone determined by the data manager 154 will be called an initial unit zone (i.e., a raw geo-unit) in order to be distinguished from a final unit zone (i.e., a final geo-unit) adjusted according to data amounts to be described later.

Figure 8:
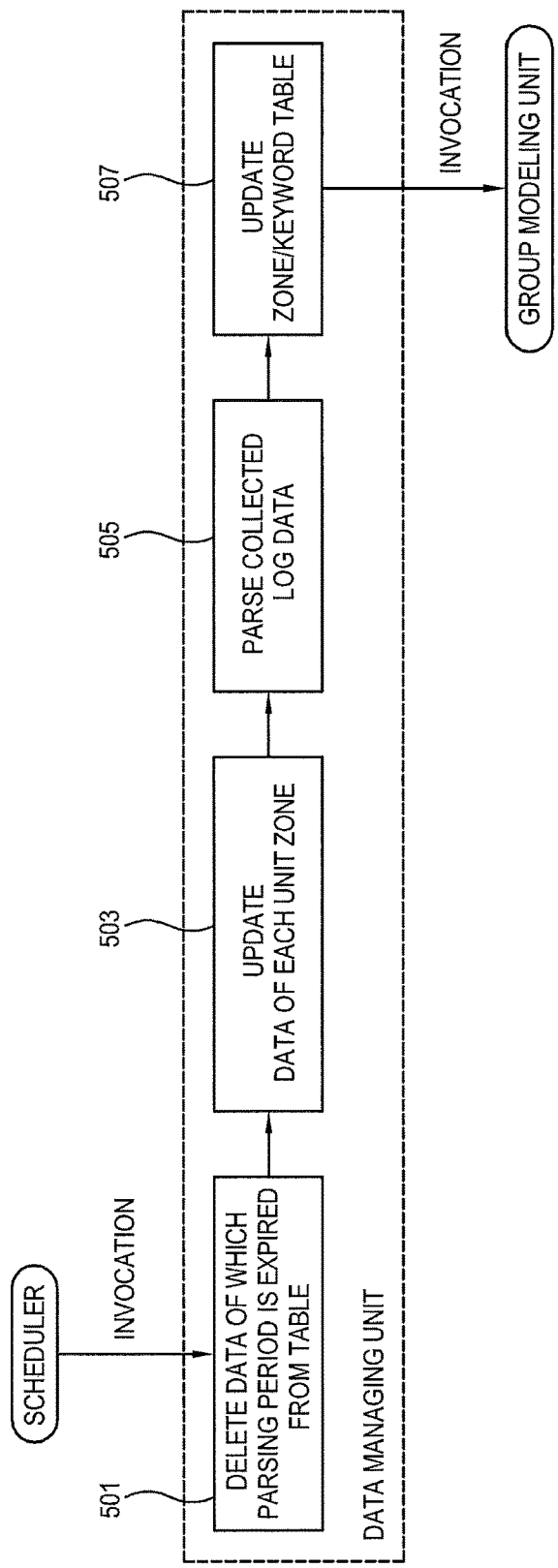
FIG. 8 is a view for explaining a process where data to be parsed is stored in a zone/keyword table for modeling according to an exemplary embodiment.

FIG. 8 is a view for explaining a process where data to be parsed is stored in the zone/keyword table 143 for the modeling according to an exemplary embodiment.

When the scheduler 151 invokes the data managing unit 152, the pre-processor 153 generates the zone/keyword table 143 based on the log data collected by the scheduler 151, and stores the data in the generated zone/keyword table 143. The zone/keyword table 143 may include a keyword table where data to be parsed (e.g., a keyword) is stored and a zone table (i.e., a geo-unit table) where data about location is stored. Here, the zone/keyword table 143 is generated once at the first operation of the GUIR, and the log data is accumulatively stored in the zone/keyword table 143 by a preset cycle (for example, one day). Also, the log data stored in the zone/keyword table 143 may be deleted starting from the oldest if a preset parsing period (for example, seven days) is elapsed.

Specifically, as shown in FIG. 8, the data manager 154 may delete data, of which an parsing period (hereinafter, referred to as a "window size") is elapsed, from the log data stored by the pre-processor 153 in the zone/keyword table 143 (501). Here, the parsing period may be previously set as seven days by way of an example, and the server 100 in this embodiment deletes the data of which the parsing period is expired and applies the modeling to the log data of last seven days, thereby providing a service.

The pre-processor 141 updates the data remaining after deleting the data of which the parsing period is expired, i.e., updates the log data within the parsing period according to the unit zones, and stores the updated data in the zone/keyword table 143 (503). For instance, the pre-processor 153 updates the data collected from the available user devices 201, 202 and 203 of the corresponding zone by the initial unit zone determined in the service zone partitioned to have the hierarchical structure according to the GEO-GRID or GEO-CELL embodiments, and then stores it in the zone/keyword table 143. Here, the data collected from the user devices 201, 202 and 203 includes information about the user device, service request data directly requested by a user (for example, an interest, a keyword, etc. directly input by a user), etc.

The data manager 154 parses the log data stored by the pre-processor 153 in the zone/keyword table 143 (505), and updates the zone/keyword table 143 with time and location data according to parsing results (507).

Here, the data manager 154 compares information about the user device stored in the zone/keyword table 143 and time information of the service request data, thereby fixing the locating information of the corresponding user device.

For example, referring to the following Table 1, a service request may be received from the user device, of which a time stamp value (Duid_A, time_stamp_X) is stored in the zone/keyword table 143, at a predetermined location within a preset period of time δ (Duid_B, time_stamp_Y). In this case, the data manager 154 compares the previously stored ID of the user device and the ID of the user device requesting for the service, and updates the location information of the corresponding user device with the location information where the service request is received if the ID information are matched with each other. Here, the time δ may be set up arbitrarily, and it is possible to obtain δ corresponding to a predetermined distance if there is log information about the moving speed of the user device. Here, δ is set up long if the user device is a stationary device, but short if the user device is a mobile device, thereby reducing an error in the location information. Thus, the log data and the location information in the zone/keyword table 143 are parsed in connection with each other, thereby improving reliability of a targeting service according to locations.

TABLE 1

| Service request log | Device log | Located added device log | |
| --- | --- | --- | --- |
| Duid_B, time_stamp_Y, loc_info(GeoIP or GPS), (Celid), . . . | Duid_A, time_stamp_X, . . . | Duid_A, time_stamp_X, Loc_info . . . | If [(time_stamp_X ±δ) includes (time_stamp_Y)] AND [Duid_B == Duid_A] THEN revise the loc_info of the device log |

Accordingly, it is easy to determine the location information even though the location information such as GPS coordinates is not involved in the data collected from the user devices 201, 202 and 203.

On the other hand, according to an exemplary embodiment, if the data collected from the user device and stored involves the GPS coordinates or the like data through which the location can be determined, the location information may be determined through the received GPS coordinates or the like without using the foregoing time stamp for determining the location.

In this exemplary embodiment, the zone/keyword table 143 may store information about the amount of data (e.g., the number of keywords, etc.) collectable from the user devices 201, 202 and 203 according to the location managing units. Also, in the case of using the location managing unit of the mobile communication network, the zone/keyword table 143 may further store the ID of the cell tower, a country code corresponding to the unit zone (group), etc.

In this exemplary embodiment, the data managing unit 152 stores data in the zone/keyword table 143 according to the unit zones, and invokes the group modeling unit 155. The group manager 156 of the group modeling unit 155 dynamically adjusts the initial unit zone, partitioned by the data managing unit 152 to perform the modeling having representability according to the unit zones, based on the amount of collectable data, thereby determining the final unit zone.

Figure 9:
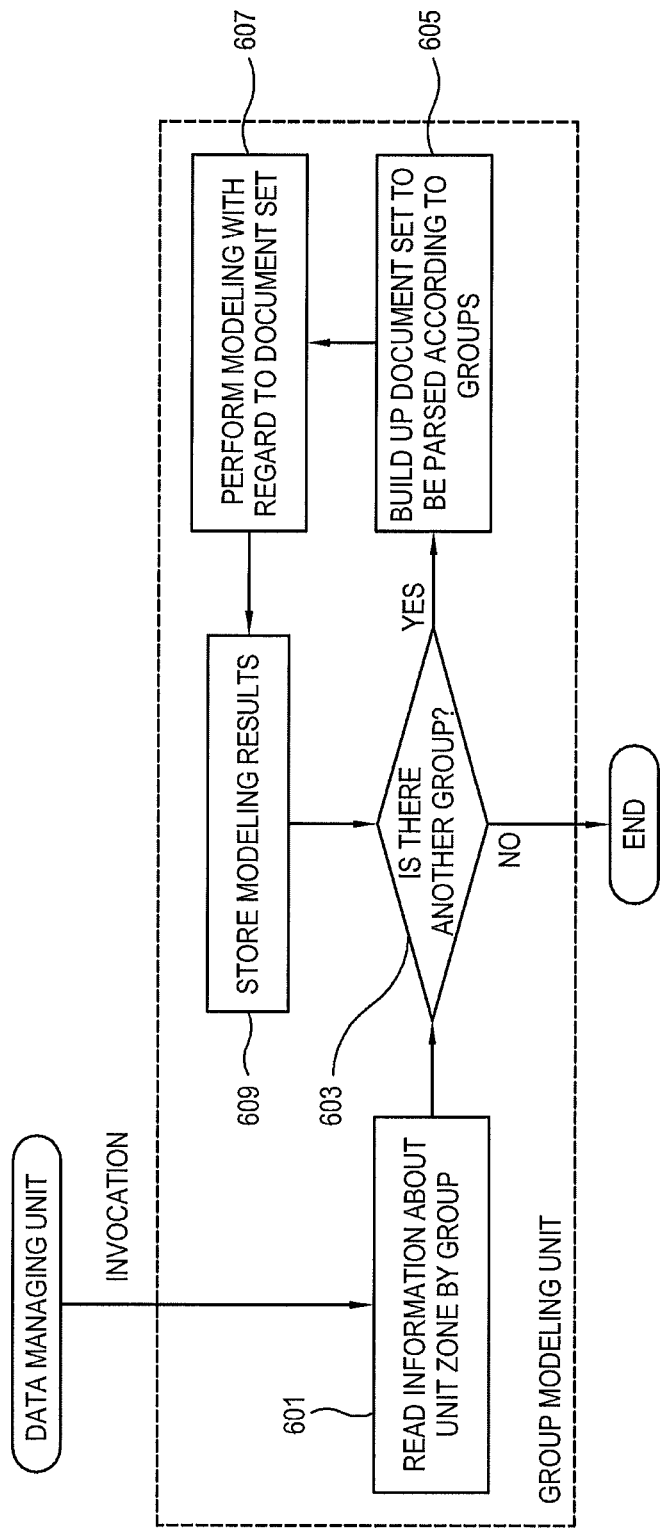
FIG. 9 is a view for explaining a process of determining a final unit zone and performing the modeling.

FIG. 9 is a view for explaining a process of determining the final unit zone and performing the modeling.

When the data managing unit 152 invokes the group modeling unit 155, the group manager 156 dynamically adjusts the initial unit zone, partitioned by the data managing unit 152, based on the amount of collectable data, and fixes the final unit zone; and the keyword modeler 157 parses the data stored in the fixed final unit zone and performs the modeling.

As shown in FIG. 9, the group manager 156 reads information about a predetermined unit zone from the zone/keyword table 143 according to group units (e.g., WG or MCC) (601). Here, the information to be read about the unit zone may be information about the amount of data collected according to the unit zones. The group manager 156 determines whether there is another group having the information to be read (603), and builds a document set for parsing by adjusting the unit zones according to the given groups (605).

For instance, the group manager 156 sets up a first minimum number of keywords with respect to the amount of data collected according to the unit zones, and filters off the zone, where the amount of collected data is less than the first minimum number of keywords, from the service zone. That is, according to an exemplary embodiment, even though the Polar Regions and the ocean regions are removed from the service zone while the group manager 156 sets up the initial unit zone, the remaining service zone may still include backwoods, mountains or the like zone where there is few or no user, and therefore the group manager 156 filters off the corresponding zone, thereby improving efficiency of a service.

a unit zone where the amount of collected data is less than the second minimum number of keywords and its adjacent unit zone can cluster together. In this exemplary embodiment, the second minimum number of keywords is set up according to the second unit zones, i.e., the TG or CT, and the TG or CT, from which the amount of data less than the second minimum number of keywords is collected, and its neighboring TG or CT cluster together and are thus managed as one TG or CT.

Likewise, the group manager 156 sets up a maximum number of keywords max_kwdTG with respect to the amount of data collected according to the unit zones, so the a unit zone where the amount of collected data is more than the maximum number of keywords can be partitioned into two or more unit zones. In this exemplary embodiment, the maximum number of keywords is set up according to the second unit zones, i.e., the TG or CT, and the TG or CT, from which the amount of data more than the maximum number of keywords is collected, is partitioned into two or more TGs or CTs to be managed as an independent unit zone.

The foregoing first procedure of filtering, clustering and partitioning for the unit zone based on the amount of data may be programmed as follows.

```
For TG_{1->j} in each WG_{1->i},
IF (no_kwgTG_j < min_kwdTG)
THEN
    CALL the ClusteringTG_j
ELSE
    IF (no_kwgTG_j < max_kwdTG)
    THEN
        IF (cell_r is exist) AND (no_kwgCell_r_TG_j > min_kwdTG) for
        all cell_r in TG_j
        THEN
            Cell_r are a final Geo-unit
        ELSE
            The TG_j is a final Geo-unit
    ELSE
        The TG_j is a final geo-unit
```

Here, clustering due to invocation of ClusteringTG, that is, a second procedure of clustering may be programmed as follows.

```
ZOOM-OUT (run)
    IF (run > runZoomOut) THEN terminate
    ELSE
        In the ((run*runZoomOut) × (run*runZoomOut) level TG-cluster,
        Find the TG_{i->m} of less than minkwdTG and other TG_{j->n}
```

$$If \left( \sum_{i=0}^{m} (nokwdTG_{\_i} * 1) + \sum_{j=0}^{n} \left( nokwdTG_{\_j} * \frac{1}{run * runZoomOut} \right) \right) >=$$

```
no_kwdToBeCluster
    THEN Revise Geo-unt table the Geo-unit for TG_j with current level of
        TG-cluster and the number of keyword of the condition of IF clause
    ELSE IF (run = runZoomOut)
        THEN Just store the result of (run × run) level TG-cluster
        ELSE (run ++ and call ZOOM-OUT)
```

Here, the group manager 156 sets up the first minimum number of keywords according to the first unit zones, i.e., the WG or MCC, and excludes the WG or MCC, from which the data is collected less than the first minimum number of keywords, from the service zone.

Also, the group manager 156 sets up a second minimum number of keywords min_kwdTG with respect to the amount of data collected according to the unit zones, so the According to the foregoing second procedure, a TG cluster level is set up according to runZoomOut values given with regard to the service zone. If ClusteringTG_j is invoked in the first procedure, the second procedure is performed in the cluster corresponding to TG_j. Here, no_kwdToBeCluster may be set up to be equal to or lower than min_kwdTG. Further, if a setup parameter of runZoomOut is 2 and clustering is performed with regard to (2 TG×2 TG), run is set up as 2.

In this exemplary embodiment, the group manager 156 periodically adjusts the unit zone through the foregoing first and second procedures, thereby grouping a valid unit zone (i.e., grouping a qualified geo-unit. Thus, if the log data needed to be updated is generated in the existing table, it is checked on a preset cycle so that the unit zone can be updated. This exemplary embodiment includes not only such a case where the unit zone is periodically adjusted but also a case where the adjustment is performed in response to a request from a manager of the server 100.

In the GEO-CELL embodiment, if the location information of the CT is available, the corresponding CT and its neighboring CT cluster together if the number of user search keywords no_kwdCell is less than the second minimum number of keywords like that in the second procedure. For example, a distance of about 5 km corresponding to the TG of the GEO-GRID embodiment is applied to the cell ID of the neighboring cell CT, and thus CTs within 5 km from the corresponding CT have a cluster level. Also, if the number of search keywords of the CT subjected to the clustering is still less than minkwdTG, the clustering corresponding to the setup runZoomOut may be repetitively performed.

Meanwhile, this exemplary embodiment describes that the first minimum number of keywords is set up by the first unit zone, and the second minimum number of keywords is set up by the second unit zone, but not limited thereto. Alternatively, the first and second minimum numbers of keywords and the maximum number of keywords may be set up by the same unit zone (for example, by the second unit zone of TG or CT). In this case, the first minimum number of keywords is set up to be less than the second minimum number.

Here, the TG and CT determined as the final unit zone by the group manager 156 may be defined as one document, and keywords in each of TG and each CT may be defined as terms or words. The WG and MCC are defined as one group, i.e., a document set, and topic modeling may be performed according to the respective groups (i.e., the document sets).

As shown in FIG. 9, the keyword modeler 157 performs the modeling (e.g., Geo-group Behavior Modeling) for offering the target service according to the document sets built by the group manager 156 (607).

In this exemplary, it will be described for convenience on the assumption that data to be parsed is a user's search keyword and the topic modeling is employed as a parsing method.

The modeling according to an exemplary embodiment is to obtain a representative result according to the unit zones. To get such a result, the topic modeling or the like parsing technique is used to calculate a representative score according to respective data (e.g., a user's search keywords) to be parsed and thus derive a high-rank keyword list as a representative keyword result.

For example, in the case of the topic modeling, the search keywords simultaneously generated in one group may establish the foundation of one topic, or a topic corresponding to preference of a user group in the corresponding zone may be subjected to the modeling.

In the case where the data to be parsed is a user's search keyword, the topic may be extracted from the keyword set based on the GEO-GRID embodiment or the GEO-CELL embodiment. For example, in the case of an advertisement service, the high-rank keyword list may be extracted in order of high probability in the keyword set of the main topics according to the final unit zones.

In the case of Latent Dirichlet Allocation (LDA), the keyword modeler 157 first performs topic assignment according to the user search keywords corresponding to the log data of the user devices 201, 202 and 203 to be parsed, second calculates a topic proportion according to the unit zones (i.e., the Geo-units), and third infers topic distributions with regard to the search keywords of all users within the corresponding group (WG or MCC). Further, the keyword modeler 157 gets probabilities according to the topics in the respective unit zones, sorts and writes the probabilities in the modeling data 145, and stores it in the first storage 140 (609). The stored modeling data 145 is obtained by extracting the high-rank keyword list of a high-rank topic among the representative topics (i.e., the keyword sets resulting from the modeling. The modeling result with regard to the corresponding unit zone may be stored as a database or an index. In the case where the modeling data 145 is stored as the index, the corresponding index is linked to the data stored in the zone/keyword table 143.

In this exemplary embodiment, the keyword modeler 157 may perform the modeling with respect to each group, and store the modeling result as the modeling data 145. The stored modeling data 145 is offered as a keyword value requested in a service through the service linker 158.

The service linker 158 searches the results according to the GUIR and offers the requested target services to the user devices 201, 202 and 203. For instance, the service linker 158 accesses the modeling data 145 when receiving a service request from a predetermined user device through the first communicator 110, reads the service data corresponding to the unit zone having the user device, and offers the service to the user device by transmission through the first communicator 110. Here, if the modeling data 145 includes index information, the service linker 158 accesses the zone/keyword table 143 via the corresponding index and reads the service data. Thus, it is possible to offer a service targeting a user placed in a unit zone that the user device of requesting for the service belongs to.

In the case of a advertisement service, as a kind of a user matching service, if a predetermined user device requests for advertisement, a keyword included in a high-rank keyword list of a predetermined topic as a modeling result of the unit zone corresponding to the location information of the user device is searched and transmitted to an advertisement server (not shown), and advertisement contents related to the keyword are received from the advertisement server and offered as an advertisement service to the corresponding user device. To this end, the server 100 may connect with various advertisement servers through a network.

Meanwhile, the foregoing exemplary embodiment describes that the modeling is performed according to the respective groups based on the unit zones and the target service is offered to according to the zones where the user device is placed, but not limited thereto. Alternatively, time information is stored along with the log data, and it is thus possible to offer a user the target service optimized according to time slots, for example, weekdays and holidays, office hours and the other time, etc.

Below, a method of offering a service based on the unit zones according to an exemplary embodiment will be described with reference to FIG. 10.

Figure 10:
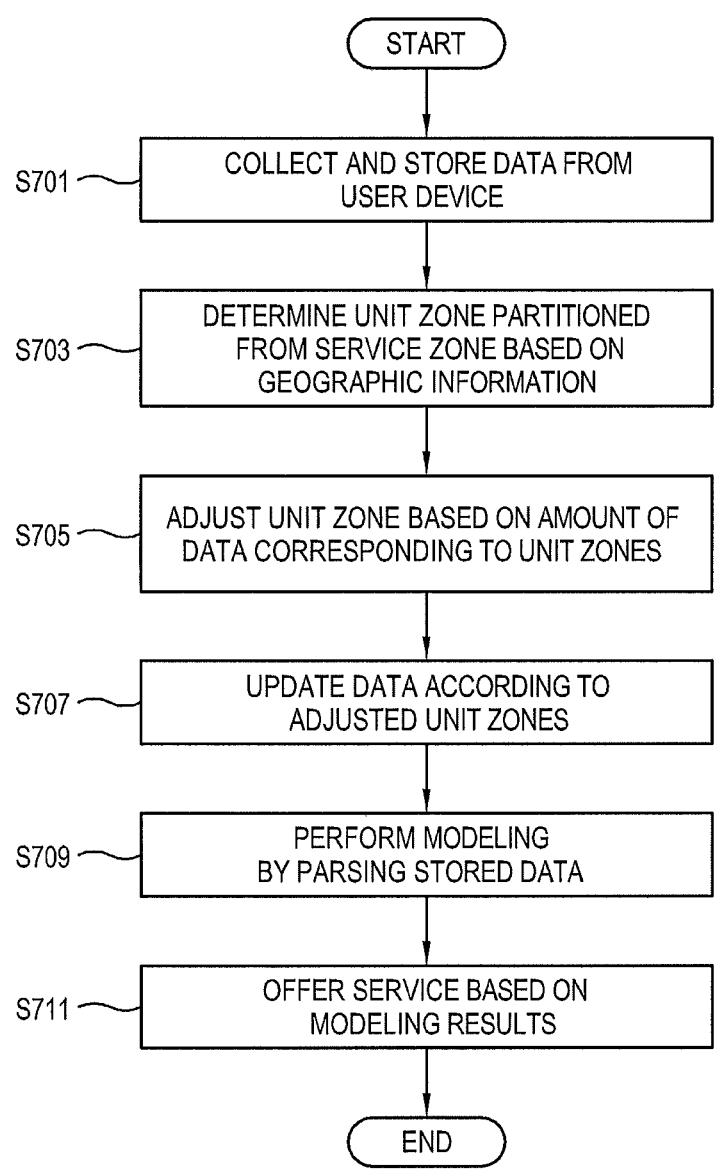
FIG. 10 is a flowchart showing a method of offering a service based on a unit zone according to an exemplary embodiment.

FIG. 10 is a flowchart showing a method of offering a service based on a unit zone.

As shown in FIG. 10, the first controller 150 of the server 100, that is, the scheduler 151 collects data from the plurality of user devices 201, 202 and 203 on a predetermined cycle (for example, everyday) (S701). Here, the collected data includes the log data 141 generated in accordance with the operations of the plurality of user devices 201, 202 and 203, and the pre-processor 153 stores the collected log data 141 in the zone/keyword table 143 of the first storage 140.

The data manager 154 determines the unit zone (i.e., the initial unit zone) by partitioning the service zone with respect to the geographic information (S703). In the case of the global service, the service zone corresponds to the whole world, and the unit zones corresponding to the Polar Regions and the ocean may be excluded from the service zone. Here, the unit zone may be defined by the WG 33 and the TG 34 partitioned based on the coordinate information according to the physical distance as shown in FIGS. 3 to 6, and by the WC 37 and the CTs 35 and 36 partitioned based on the ID information of the location managing unit (i.e., the cell tower) in the mobile communication network as shown in FIG. 7. In this exemplary embodiment, the unit zone is set up to have a hierarchical structure that involves a plurality of first unit zone groups (WG, MCC) and a plurality of segmented unit zones (TG, CT) included in each group. The data manager 154 may update the zone/keyword table 143 with both the location information of the unit zone defined as above and the log data 141 collected in the operation S701 and stored to be link with the corresponding unit zones WG, TG, CT and MCC.

The group manager 156 dynamically adjusts the initial unit zone determined in the operation S703, based on the amount of data collectable according to the unit zones (for example, the number of search keywords) (S705). Here, the adjusted unit zone will be called the final unit zone to be distinguished from the initial unit zone. For instance, the group manager 156 sets up the first minimum number of keywords with respect to the grouped unit zone WG and MCC, and filters the unit zone, where the data is collected less than the first minimum number of keywords, from the service zone. Further, the group manager 156 sets up the second minimum number of keywords and the maximum number of keywords with respect to the segmented unit zones TG and CT, and manages the unit zone, where the data is collected less than the second minimum number of keywords, and its neighboring unit zone to cluster together, or partitions the unit zone, where the data is collected more than the maximum number of keywords, into two or more unit zones. Detailed operations for the filtering, clustering and partitioning may for example be achieved as the first controller 150 executes the program such as the first and second procedures. Such adjustment of the unit zone may be performed periodically or when it is requested by the manager of the server 100.

The group manager 156 updates the data stored in the zone/keyword table 143 in order to correspond to the final unit zone determined by the adjustment in the operation S705 (S707).

The keyword modeler 157 performs the modeling by parsing the data stored in the operation S707 (S709). Here, the data to be parsed is a user's search keyword, and the topic modeling method may be employed as the parsing method. Thus, a representative topic may be determined in consideration of a user's preference, and the high-rank keyword list may be extracted with respect to the representative topic. The modeling results are stored as the modeling data 145 in the first storage 140.

The service linker 158 offers the target service to a user in accordance with the modeling results in the operation S709 (S711). For instance, the service linker 158 accesses the modeling data 145 when receiving a service request from a predetermined user device, reads data corresponding to the unit zone where the user device requesting the service is placed, and transmits it to the corresponding user device. Thus, it is possible to offer a service targeting a user of the unit zone where the user device requesting the service is placed.

According to an exemplary embodiment of the present invention, the subjects of collecting the data from the user device, storing and parsing them according to the unit zones, and offering the target service are unified into the server 100. In the server 100, the data collected from the plurality of stationary or mobile user devices is stored according to the unit zones, and the unit zone is adjusted so that the representative features of the corresponding unit zone can be parsed to be utilized for the target service. Here, the unnecessary zones are excluded from the service zone in order to reduce the load, and the unit zone is dynamically adjusted according to the amount of data to be parsed and the data is periodically updated so as to offer a service based on the up-to-date information. Here, the current location of not only the stationary user device but also the mobile user device (e.g., a portable terminal) can be reflected on offering the service.

Also, according to an exemplary embodiment, the high-rank keyword list is given in consideration of correlation among the keyword searched in similar environments (e.g., the same or adjacent zone) of the user device, information of various user devices, log, etc., thereby offering the target service optimized to users of the similar environments.

Further, according to an exemplary embodiment, the parsing is performed with respect to a predetermined number of unit zones TGs or CTs within the partitioned group WG or country (MCC) in even the global service, and it is thus easy to extend the service. For example, a world grid may include about 1,600 town grids, and it is thus possible to previously build up a stable service system that can secure the reliability of the service by the world grid. The high-rank keyword list resulting from the modeling according to the unit zones may be utilized for service targeting adapted for the user devices of users who visit the corresponding zone for a predetermined period of time. Here, it is possible to grasp not only geographic information in which users of the devices in a certain zone are interested, but also a common topic of a device user group who temporarily or periodically visits the corresponding zone (e.g., office workers who commute to the certain zone), thereby offering a service for forming communities corresponding to topics. Thus, it is possible to offer a service (e.g., an advertisement) adapted for the community, recommending a search word, etc. Also, it is possible to offer contents about main issues or inclination of a zone to a device of a user who first visits the corresponding zone, based on interests parsed according to the zones. If such parsed results are utilized for an advertisement service, an advertiser can selectively put an advertisement with regard to a desired zone based on location coordinates connected to the unit zone, thereby reducing advertising expenses and concentrating on competiveness.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of offering a service targeting a user, performed in a server that manages data the method comprising:

collecting log data from a plurality of user devices, the collected log data corresponding to execution histories which are generated and written in each of the plurality of user devices;

determining a plurality of unit zones partitioned from a service zone based on at least one of location information mapped according to cell towers or cell identification (ID) information of the cell towers, the plurality of unit zones corresponding to grid cells;

grouping the plurality of unit zones based on an amount of data collectable with respect to the partitioned plurality of unit zones, respectively performing a probabilistic topic modeling for the collected log data with respect to the grouped plurality of unit zones, respectively, the performing the probabilistic topic modeling comprising getting probability values for topics based on the collected log data with respect to the grouped plurality of unit zones, respectively, and obtaining a representative result by extracting data in order of high probability value among the topics from the collected log data using the probability values with respect to the grouped plurality of unit zones, respectively;

receiving a service request from a predetermined user device, the receiving including receiving the service request from the predetermined user device of which a time stamp value is stored in the server, at a predetermined location within a preset period of time;

determining, in response to the receiving of the service request, a unit zone among the grouped plurality of unit zones where the predetermined user device requesting the service is placed, the determining the unit zone including comparing ID information of the predetermined user device with previously stored ID information thereof, and in response to the ID information being matched with each other, updating location information of the predetermined user device with location information where the service request is received, and determining the unit zone where the predetermined user device requesting the service is placed based on the updated location information; and offering a representative result corresponding to the determined unit zone as a service targeting a user of the predetermined user device based on the probabilistic topic modeling data.

2. The method according to claim 1, wherein the determining the plurality of unit zones comprises excluding unit zones corresponding to Polar Regions and the ocean from the service zone.

3. The method according to claim 1, wherein the grouping the plurality of unit zones comprises setting up a first minimum number of keywords with regard to log data collected for the partitioned unit zones, and excluding a unit zone, where the collected data is equal to or more than the first minimum number of keywords, from the service zone.

4. The method according to claim 1, wherein the grouping the plurality of unit zones comprises setting up a second minimum number of keywords with regard to data collected for the partitioned unit zones, and making a unit zone, where the collected data is less than the second minimum number of keywords, and a neighboring unit zone cluster together as one final unit zone.

5. The method according to claim 1, wherein the grouping the plurality of unit zones comprises setting up a maximum number of keywords with regard to data collected for the partitioned unit zones, and partitioning an unit zone, where the collected data is equal to or more than the maximum number of keywords, into two or more final unit zones.

6. The method according to claim 1, wherein the grouping the plurality of unit zones is performed on a preset cycle or in response to a request of a manager.

7. The method according to claim 1, wherein the determining the plurality of unit zones comprises using coordinate information according to physical distances or identification information of a location managing unit of a mobile communication network.

8. The method according to claim 1, wherein each of the plurality of unit zones has a grouped hierarchical structure which comprises a plurality of first unit zones and a plurality of second unit zones that belong to each first unit zone.

9. The method according to claim 1, wherein the performing the probabilistic topic modeling comprises:
determining a representative topic based on the probability values for topics based on data collected for the grouped plurality of unit zones, respectively; and
extracting a keyword list in order of high probability value with respect to the representative topic.

10. The method according to claim 1, wherein the collecting the log data comprises receiving location information and log information about a user device.

11. The method according to claim 10, further comprising determining the location information based on information about moving speed of the user device.

12. The method according to claim 1, wherein the collecting the log data comprises receiving the log data from the plurality of user devices in accordance with preset cycles, accumulatively storing the received log data and sequentially deleting log data of which a preset period of time is expired.

13. The method according to claim 1, wherein the collected log data comprises at least one of a search keyword, time information, location information, a time stamp, identification information, a usage history, and a user input command.

14. The method according to claim 1, wherein the service to be offered comprises at least one of an advertisement targeting a user in the determined unit zone, a search keyword, direction information during driving or walking, price information about goods, information about a nearby restaurant, shop and tourist spot, show time of a film, contact information for business, and traffic information.

15. The method according to claim 1, further comprising storing the log data collected from the plurality of user devices together with a location information of the unit zones, in a table in connection with the corresponding unit zones, and
updating the log data stored in the table in order to correspond to the grouped plurality of unit zones.

16. A server of offering a service targeting a user to a plurality of user devices, the server comprising:
a communicator which collects log data from the plurality of user devices;
a storage which stores the collected log data; and
a controller configured to:
control the communicator to collect the log data, the collected log data corresponding to execution histories which are generated and written in each of the plurality of user devices,
determine a plurality of unit zones partitioned from a service zone based on a least one of location information mapped according to cell towers or cell identification (ID) information of the cell towers, the plurality of unit zones corresponding to grid cells, group the plurality of unit zones based on an amount of data collectable with respect to the plurality of partitioned unit zones, respectively, perform a probabilistic topic modeling for the collected log data with respect to the grouped plurality of unit zones by getting probability values for topics based on the collected log data with respect to the grouped plurality of unit zones, respectively, and obtain a representative result according to extracting of data of in order of high probability value among the topics from the collected log data using the probability values with respect to the grouped plurality of unit zones, respectively, receive a service request from a predetermined user device through the communicator, determine a unit zone among the final unit zones where the predetermined user device requesting the service is placed in response to the reception of the service request, and offer a representative result corresponding to the determined unit zone as a service targeting a user of the predetermined user device based on the probabilistic topic modeling data, wherein the controller is further configured to:

receive the service request from the predetermined user device of which a time stamp value is stored in the server, at a predetermined location within a preset period of time, compare ID information of the predetermined user device with previously stored ID information thereof, and in response to the ID information being matched with each other, update location information of the predetermined user device with location information where the service request is received, and determine the unit zone where the predetermined user device requesting the service is placed based on the updated location information.

17. The server according to claim 16, wherein the controller excludes unit zones corresponding to Polar Regions and the ocean from the service zone.

18. The server according to claim 16, wherein the controller sets up a first minimum number of keywords with regard to log data collected for the partitioned unit zones, and excludes a unit zone, where the collected data is equal to or more than the first minimum number of keywords, from the service zone.

19. The server according to claim 16, wherein the controller sets up a second minimum number of keywords with regard to data collected for the partitioned unit zones, and makes a unit zone, where the collected data is less than the second minimum number of keywords, and a neighboring unit zone cluster together as one final unit zone.

20. The server according to claim 16, wherein the controller sets up a maximum number of keywords with regard to data collected for the partitioned unit zones, and partitions a unit zone, where the collected data is equal to or more than the maximum number of keywords, into two or more final unit zones.

21. The server according to claim 18, wherein the controller performs the grouping of the plurality of unit zones on a preset cycle or in response to a request of a manager.

22. The server according to claim 16, wherein the controller determines the plurality of unit zones using coordinate information according to physical distances or identification information of a location managing unit of a mobile communication network.

23. The server according to claim 16, wherein each of the final unit zones has a grouped hierarchical structure which comprises a plurality of first unit zones and a plurality of second unit zones that belong to each first unit zone.

24. The server according to claim 16, wherein the controller performs the probabilistic topic modeling by determining a representative topic based on the probability values for topics based on data collected according to the final unit zones, respectively, and extracting a keyword list in order of high probability value with respect to the representative topic.

25. The server according to claim 16, wherein the communicator receives location information and log information about the plurality of user devices.

26. The server according to claim 25, wherein the controller further receives information about moving speed of the user device, and determines the location information based on the information about moving speed of the user device.

27. The server according to claim 16, wherein the controller controls the communicator to receive the log data from the plurality of user devices in accordance with preset cycles, accumulatively stores the received log data in the storage, and sequentially deletes log data of which a preset period of time is expired.

28. The server according to claim 16, wherein the collected log data comprises at least one of a search keyword, time information, location information, a time stamp, identification information, a usage history, and a user input command.

29. The server according to claim 16, wherein the service to be offered comprises at least one of an advertisement targeting a user in the determined unit zone, a search keyword, direction information during driving or walking, price information about goods, information about a nearby restaurant, shop and tourist spot, show time of a film, contact information for business, and traffic information.

30. The server according to claim 16, wherein the controller stores the log data collected from the plurality of user devices together with a location information of the partitioned unit zones, in a table in connection with the corresponding initial unit zones, and updates the log data stored in the table in order to correspond to the grouped plurality of unit zones.

* * * * *